Figure 6:
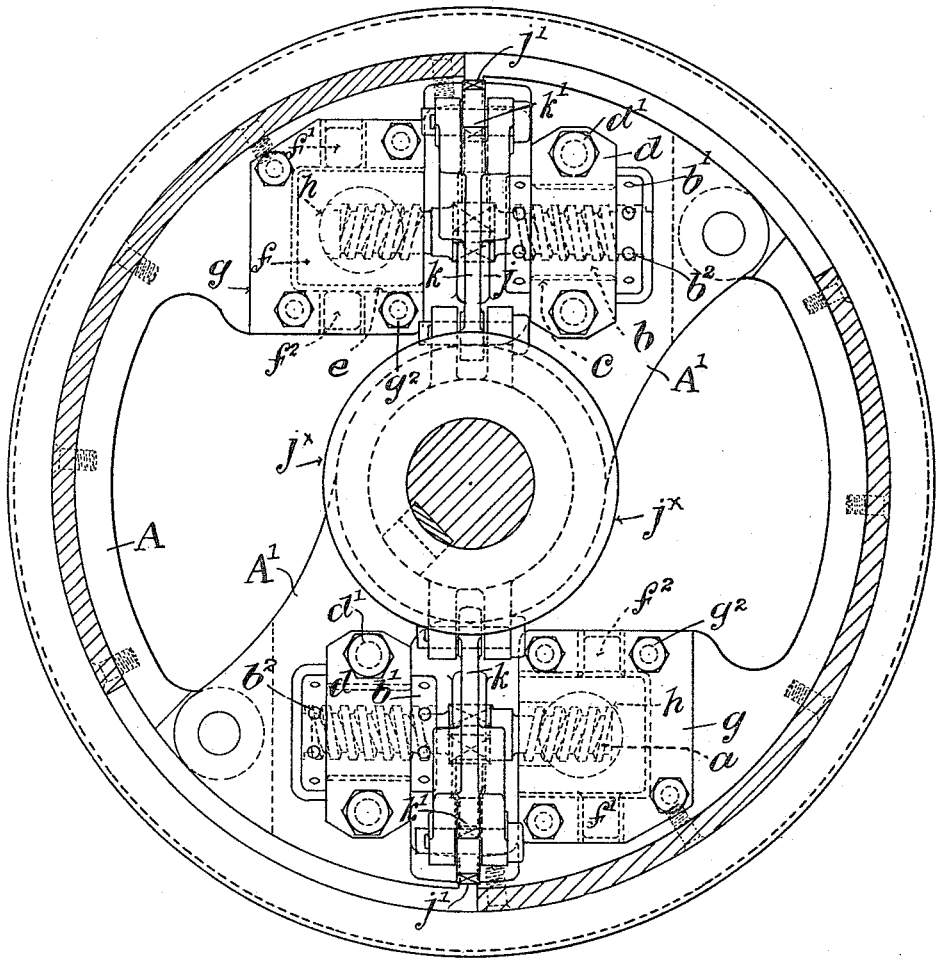

R. &. J. BRIDGE & E. BRADSHAW.
FRICTION CLUTCH.
APPLICATION FILED JULY 3, 1914.
1,127,724.
Patented Feb. 9, 1915.
4 SHEETS—SHEET 1.
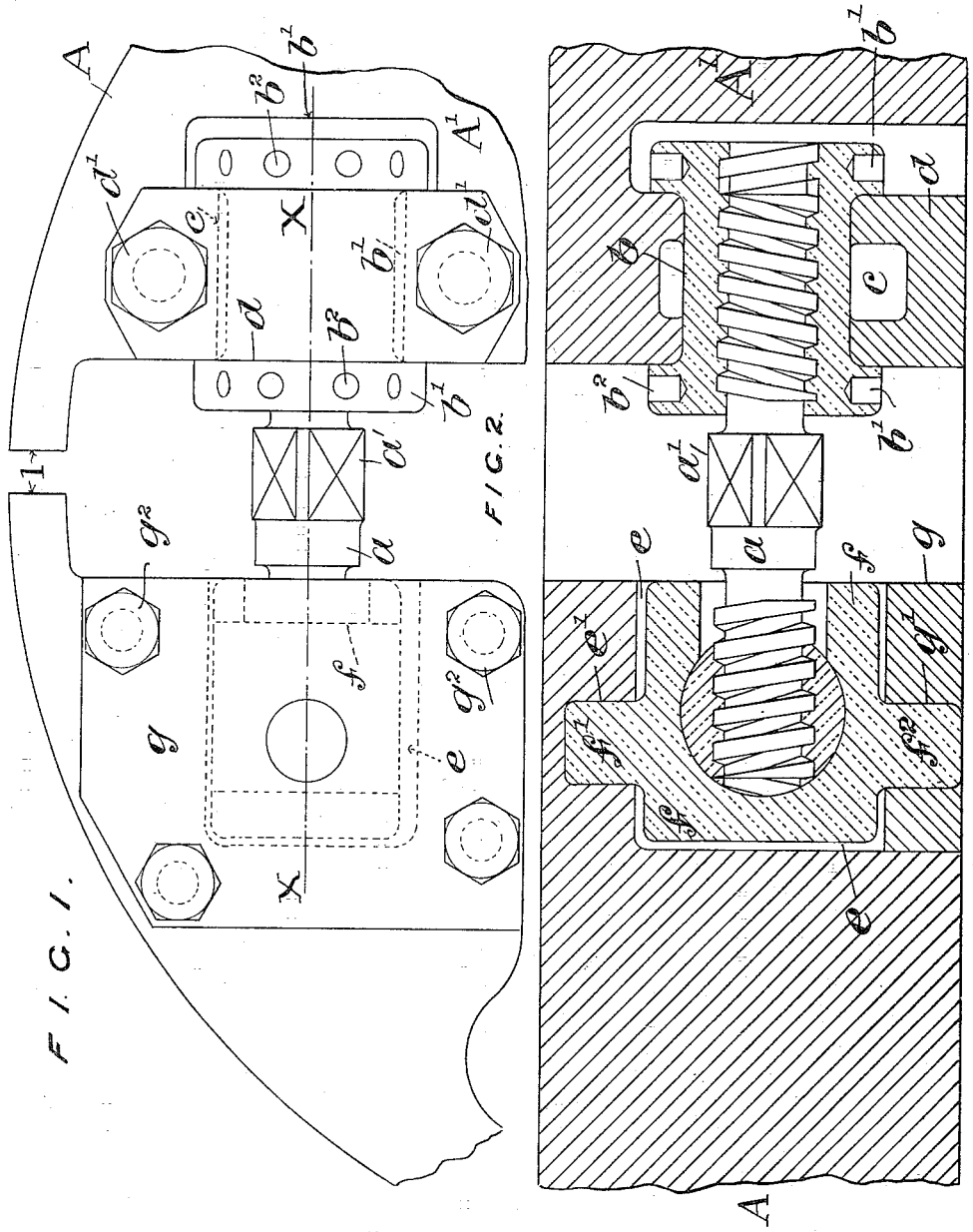
WITNESSES:
John C. Sanders
Albert F. Heuman
INVENTORS:
Robert Bridge
Jonathan Bridge
Edgar Bradshaw
BY Wm. Wallace White
ATT'Y

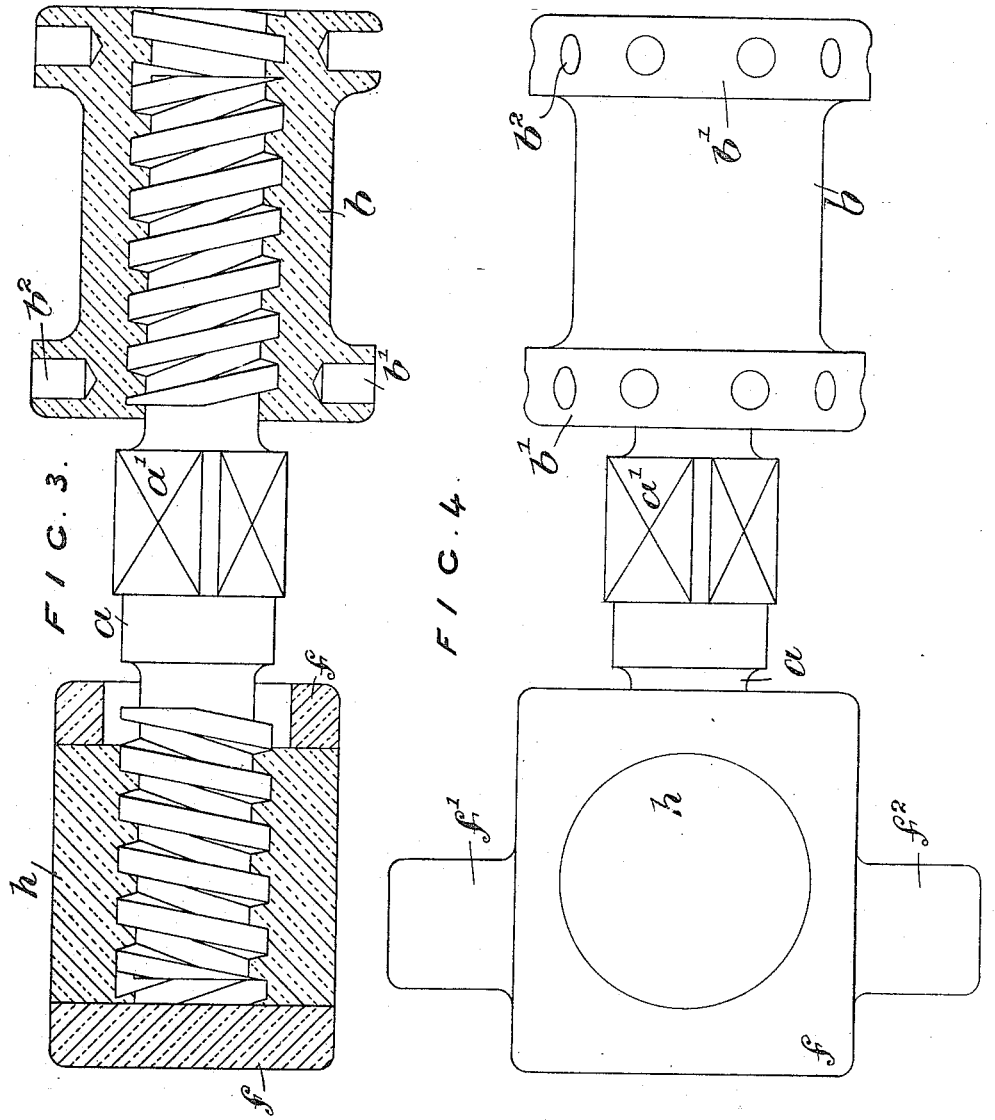

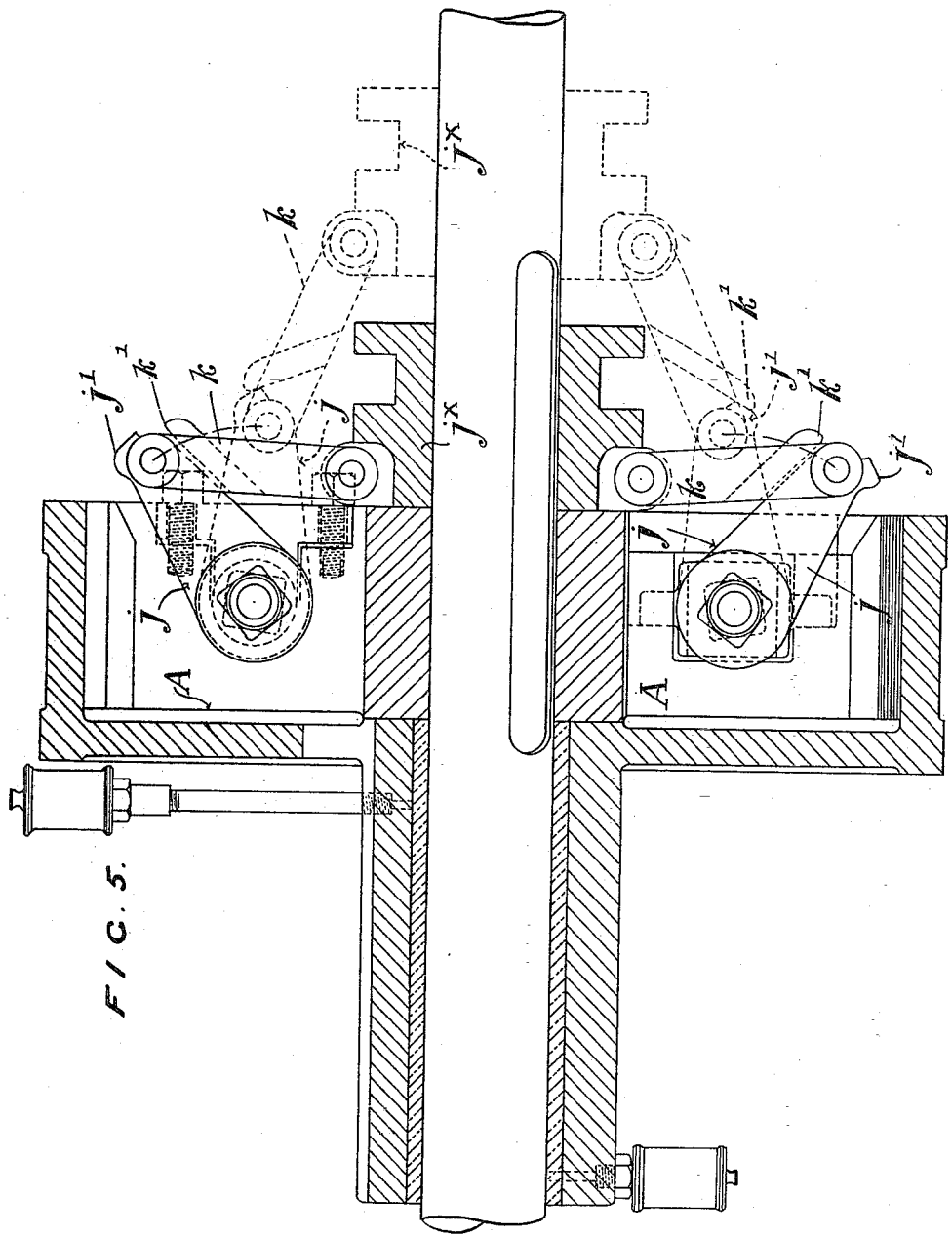

R. & J. BRIDGE & E. BRADSHAW.
FRICTION CLUTCH.
APPLICATION FILED JULY 3, 1914.

1,127,724.

Patented Feb. 9, 1915.
4 SHEETS—SHEET 4.

WITNESSES:
John C. Sanders
Albert F. Henman

INVENTORS:
Robert Bridge
Jonathan Bridge
Edgar Bradshaw
By Wm. Wallace White
ATT'Y

UNITED STATES PATENT OFFICE.

ROBERT BRIDGE, OF ROCHDALE, JONATHAN BRIDGE, OF CASTLETON, AND EDGAR BRADSHAW, OF ROCHDALE, ENGLAND.

FRICTION-CLUTCH.

1,127,724.  Specification of Letters Patent.  Patented Feb. 9, 1915.

Application filed July 3, 1914. Serial No. 848,885.

*To all whom it may concern:*

Be it known that we, ROBERT BRIDGE, JONATHAN BRIDGE, and EDGAR BRADSHAW, subjects of the King of Great Britain and Ireland, residing, respectively, at Clovelly, Rochdale, in the county of Lancaster, England; Vicarage Road, Castleton, in the aforesaid county, and 137 Edmund street west, Rochdale aforesaid, have invented new and useful Improvements in or Connected with Friction-Clutches, of which the following is a specification.

This invention relates to friction clutches of the type in which an internal ring or casting cut at two points is used and such interial ring is formed integral with the arms and boss. In some cases, portions of the expansion ring have been hinged to the supporting arms cast along with the boss. In all cases, the expansion and contraction of the split ring has been obtained by screws suitably actuated by link mechanism.

Now our present invention relates to improvements upon clutches of the indicated kind, and, in particular (but not necessarily) to the type of clutch where portions of the expansion ring are hinged. The improvements have especial reference to the nut and screw mechanism which works the expansion ring, whereby the same is rendered more accommodating, and to the link mechanism in connection with right and left hand screw devices. Such improvements are clearly illustrated in the attached drawings, wherein:

Figure 1 shows in front view our new nut and screw mechanism for the purpose of influencing the expansion ring. Fig. 2 is a cross-sectional plan on the line X—X, Fig. 1. Fig. 3 shows in section a slight modification of the nut and screw mechanism, and Fig. 4 is a front elevation of Fig. 3. Fig. 5 is a sectional elevation of a complete clutch and illustrates our improvements in connection with the link gear to actuate the nut and screw mechanism. Fig. 6 is a front elevation of the complete clutch seen in Fig. 5, and with the improvements to be now fully described shown in combination.

Referring in the first place to the nut and screw mechanism, we still use a right and left-hand screw device $a$, the irregular portion $a'$ of which is worked by links to effect rotation of said screw device $a$. As to the right-hand length of this screw we arrange for that to work in a bored nut $b$ cut with an internal thread, and, which nut $b$ is turned in a lathe to present a round or other exterior shape. Such nut has a ruff or flange $b'$, at each end, having "tommy" holes $b^2$, and, this nut is simply dropped into a cored or bored out chamber or recess $c$ in the arm $A'$ of the expansion ring casting A. The turned barrel of the nut $b$ fits the recess $c$ and the ruffs $b'$ prevent end movement. A cap $d$ carried by two studs $d'$ clamps the complete nut $b$ in place. By slackening back the studs $d'$, the turned nut $b$ can be adjusted on rotating the same in its recess by means of a tool which will engage the "tommy" holes $b^2$.

Respecting the other or left-hand length of the actuating screw $a$, this is carried in such a manner, as that, movement of engaging parts carried by the expansion ring in two or more directions is possible either when the ring is expanded or contracted. This provision gives greater compensating and accommodating power to the actuating parts, and, not only makes the clutch easier to work and more efficient, but, minimizes risk of breakage.

We cast or prepare in one with the split ring and adjacent to where the ring is cut at 1 to produce the split a chamber or recess $e$ with a horizontal gap $e'$ (see Fig. 2) extending from or merging into the main chamber or recess. In this, we fit a block or casting $f$ which has horizontal trunnions or extensions $f'$, $f^2$, one of which lies in the gap $e'$ while the other occupies a hole $g'$ in the cover plate $g$, which cover plate $g$ is fixed by studs $g^2$ to the flexible segment of the expansion ring or casting. The block $f$ is a slidable fit, and, the trunnions or extensions $f'$, $f^2$ guide any movement of the block due to said trunnions or extensions $f'$ $f^2$ acting as an axis to said block. This block $f$ is bored right through, that is, vertically and is fitted with a turned nut $h$ which occupies the bored passage, and, this nut is tapped to produce a coarse screw thread to accommodate the left-hand half of the actuating screw a. The block f is cored out, or cut away, to allow the screw to reach the round nut. The applied cover plate g effectually confines the entire block and nut and shrouds the parts and gives a neat finish.

Presuming the expansion ring or casting to have hinged segments (as shown by Fig. 6) it is apparent that this method of forming and sustaining a nut is a good mechanical way of providing the necessary accommodation it being seen, that, when the clutch is worked not only is each segment "expanded," but, slight angular movement takes place which the nut and screw mechanism just described satisfactorily permits.

As a modification (for which see the Figs. 3 and 4), the block f could be formed with vertical trunnions or extensions $f'$ $f^2$ top and bottom, working in vertical gaps, extending off the chamber or recess e, and the round nut h be horizontally disposed in a bored gap in the block f, the requisite variations being made in the casting and cover plate as shown. The cover plate g, in such case, would be a plain flat one secured by studs $g'$ and of a form such as is shown in Fig. 6.

From what has been said, it is clear, that, not only may the nut h rotate in the block f but the block itself has freedom of movement in two directions for the purposes in view.

A further feature of the construction described and shown, is, that the whole of the parts can be machined and tooled ready for fitting together, all necessary accommodating power being inherent in the arrangement.

It is obvious, nut mechanism of the indicated type is fitted with respect to each split in the expansion ring or casting as shown.

In the link mechanism used to actuate the right and left hand screws a, and which mechanism usually consists of two links to each screw element, the same, being worked by a sliding sleeve such as $j^x$, it is found that the links are apt to fall into perfect alinement and so to make it difficult to throw the clutch in. Therefore, stop collars have been used to limit the outward movement of the sleeve $j^x$. Now we propose to cast or apply lugs or projections $j'$ $k'$ on the links j k, which lugs $j'$ $k'$ when the sleeve is withdrawn, abut together (see the dotted lines Fig. 5) and before the links j k reach a position which amounts to perfect alinement. Thus, the sleeve $j^x$ is always ready to be pushed in, and a stop collar can be dispensed with.

We declare that what we claim is:

1. A friction clutch of the split ring expansion type with right and left-hand actuating screws and having a compound compensating support carried in the expansion segment consisting of a block, trunnions thereon, bearings for the trunnion in the hinged segment, a swivel nut fitting the block, and a passage way in the block for the actuating screw as set forth.

2. A friction clutch of the split ring type having cast arms and hinged segments, an adjustable nut clamped in each fixed arm and an accommodating nut combination in each hinged segment consisting of a recessed block with trunnions, bearings for the trunnions carried in each hinged segment, and a round swiveling nut in each block, and right and left-hand screw devices actuating to work in the two nuts, and link mechanism working the right and left-hand screw devices as described.

3. A friction clutch device comprising a boss, arms cast therewith, segments hinged to the arms, a fixed nut carried by each arm, a block carried in each hinged segment, trunnions on said block, bearings for the trunnions, a swivel nut in the block, means to clamp the nuts in place, and right and left hand screw devices engaging the nuts, link mechanism for said screw devices and lugs on the links, and a sliding sleeve by which the links are operated.

4. A friction clutch comprising a boss, arms projecting therefrom, segments hinged to the arms, a chamber in each arm, a nut in said recess and a cover plate, a chamber in each hinged segment and a block therein, trunnions on the block, bearings for the trunnions, a cover plate confining the block, and a swivel nut in the block, right and left-hand screw devices engaging the nuts and links to actuate the screws, said links having lugs thereon, and a sliding sleeve to actuate the links all in combination and as set forth.

In testimony whereof we have signed our names to this specification in the presence of two subscribing witnesses.

ROBERT BRIDGE.
JONATHAN BRIDGE.
EDGAR BRADSHAW.

Witnesses:
ALBERT JORDAN,
NORMAN KIERNAN.

Copies of this patent may be obtained for five cents each, by addressing the "Commissioner of Patents, Washington, D. C."